UNITED STATES PATENT OFFICE.

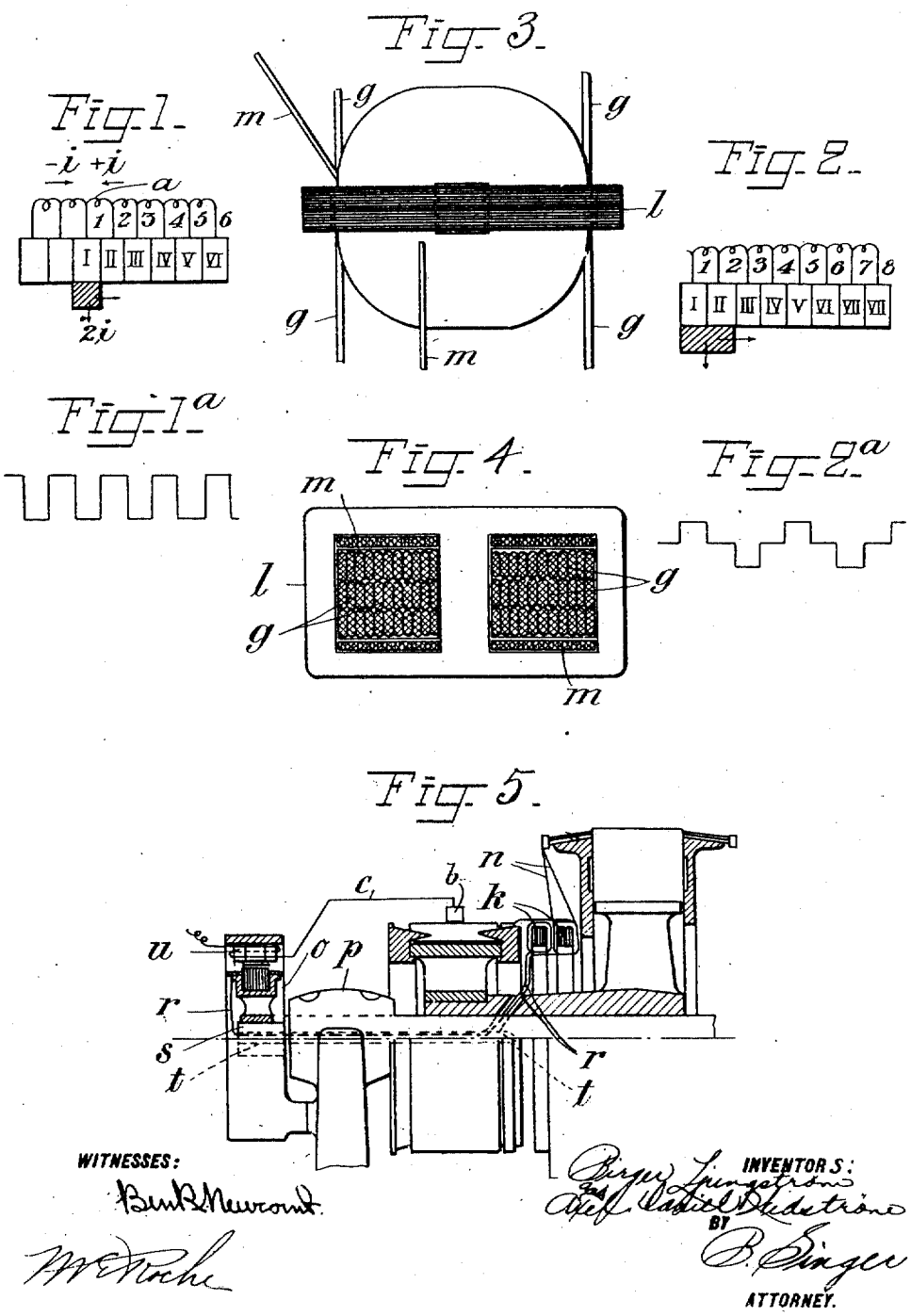

BIRGER LJUNGSTRÖM AND AXEL DANIEL WIDSTRÖM, OF STOCKHOLM, SWEDEN; SAID WIDSTRÖM ASSIGNOR TO SAID LJUNGSTRÖM.

COMMUTATION DEVICE FOR DIRECT-CURRENT MACHINES AND THE LIKE.

1,228,936.   Specification of Letters Patent.   Patented June 5, 1917.

Application filed February 24, 1913. Serial No. 750,262.

*To all whom it may concern:*

Be it known that we, BIRGER LJUNGSTRÖM and AXEL DANIEL WIDSTRÖM, citizens of Sweden and subjects of the King of Sweden, residing at Stockholm, in the Kingdom of Sweden, have invented certain new and useful Improvements in Commutation Devices for Direct-Current Machines and the like, of which the following is a specification.

In electric machines provided with commutators, especially those machines which have closed armature windings, where the contact resistance alone is not sufficient to produce a sparkless reversal of the current in the short circuited coils and brush displacement is not admissible or is insufficient for producing good commutation, it is usual to arrange between the main poles of the machine special commutation poles which have for their object to induce in the short circuited coils the E. M. F. required for sparkless commutation. These commutation poles must have comparatively powerful exciting windings as they have not only to overcome the magnetic reluctance to the passage of the flux of the commutation field across the air gaps, but have also to balance the influence of the whole armature winding which is effective at these points. Commutation poles must accordingly be comparatively expensive and also have other disadvantages, as they increase the leakage from the main poles and limit the space available for the main exciting windings and decrease the ventilation effect.

It is the principal object of our invention to provide an arrangement which will produce practically perfect commutation, but which will at the same time not disturb the magnetic design of the generator. A further object of our invention resides in the particular arrangement and combination of parts hereinafter described.

The disadvantages above mentioned may be avoided by means of a device which causes the E. M. F. necessary for commutation to be induced in such a part of the short circuited coils that the total number of armature ampere-turns does not act against the exciting winding. It will be obvious that the E. M. F. necessary for commutation will vary with the load.

In accordance with the present invention this result is attained by arranging the commutator connectors as one of the windings on one or more transformers, the other windings of which are supplied with current from an alternator, hereinafter termed a commutation generator, which is driven synchronously by the main generator and produces an E. M. F. of suitable magnitude, waveform and frequency. Since only these commutator connectors attached to the segments under the brushes are carrying current, the number of the primary ampere-turns required on the transformer, and accordingly the number of ampere-turns required for the field magnets of the "commutation generator", is only a fraction of what would be required with commutation poles arranged in the usual manner.

In the following explanation of the operation of the device, the transformer or transformers can be disregarded, since their object is only to induce an E. M. F. in the short-circuited coils in a simple manner which, at the same time, permits the selection of that relation between current and potential which is most suitable for the commutation generator. We may accordingly suppose that the commutation generator directly induces an E. M. F. in the commutator connectors of the short circuited part of the armature winding.

In the accompanying drawing:—

Figure 1 is a diagrammatic view of a commutator showing the coils undergoing commutation and in which the brush has the width of one commutator segment.

Fig. 1ᵃ is a diagrammatic view of the wave form of the electro-motive force necessary to be produced by the commutation generator in order to produce perfect commutation in the machine illustrated in Fig. 1.

Fig. 2 is a diagrammatic view similar to Fig. 1 but in which the brush has a width of two commutator segments.

Fig. 2ᵃ is a diagrammatic view of the wave form of the commutation generator which would be necessary to produce perfect commutation in the arrangement shown in Fig. 2.

Fig. 3 is an elevational view of a transformer used in connection with our invention.

Fig. 4 is a sectional view of the transformer used in Fig. 3 taken at right angles to Fig. 3.

Fig. 5 is an elevational view, partly in section, showing our invention as applied to a generator of the rotating armature design.

Throughout the separate views the same part is designated by the same reference character.

Referring more particularly to the drawings and to Figs. 1, 1ª and 2 and 2ª which are diagrams of a well known type, the meaning of which will be understood from the following discussion:—

Let us assume, firstly, that the width of the brush is equal to the width of a segment, see Fig. 1. It will be recognized that, while the brush passes from segment I to segment II, the current in the coil $a$ will be changed from $+i$ to $-i$. With correct commutation this change will occur at a constant rate and the E. M. F. which is to be induced in the short-circuited armature coil will be of constant value and will act in the same direction as the current change, that is, upwardly in the connector 1 with a value equal to $+E$ and downwardly in the connector 2 with a value equal to $-E$. While the brush passes segment II there will be induced in the connector 2 an E. M. F. equal to $+E$ and in the connector 3 an E. M. F. equal to $-E$. It will therefore be seen that the commutation generator will have an E. M. F. wave-form as shown in Fig. 1ª, where the period corresponds to the time required for the brush to pass two segments.

If the brush covers two segments it will be recognized in the same manner, see Fig. 2, that while the front edge of the brush is passing the segment III an upwardly directed E. M. F. having the value $+E$ will be induced in the connector 1 and an E. M. F. having the value $-E$ will be induced in the connector 3, while the value of the E. M. F. in the connector 2 will be zero. While a brush passes the segment IV an E. M. F. having the value $+E$ will be induced in the connector 2 and an E. M. F. having the value $-E$ will be induced in connector 4, while the E. M. F. in the connector 3 will be zero. The commutation generator must accordingly be of the two-phase type and all the odd numbered connectors must be arranged in one phase and all the even numbered connectors in the other phase. The wave-form of the E. M. F. of each phase of the commutation generator is as shown in Fig. 2ª. The period is equal to the time required for the edge of a brush to pass four segments.

From similar considerations it will be readily recognized that when the brush covers three segments the commutation generator will be of the three-phase type.

An example of one form of transformer is shown in Figs. 3 and 4 which are side view and horizontal sectional view, respectively. In these figures, $l$ indicates the laminated iron core, $g$—$g$ the secondary windings, and $m$—$m$ the primary windings. One of the windings $g$ is wound in one direction and the other in the other direction, the first being connected into the lead running to the commutator on one side of the armature conductors undergoing commutation and the second into the lead at the other side of such armature conductors.

The transformer just described is suitable for use with rotating field dynamos in which the commutator is separated from the dynamo or generator circuit.

The generators having rotating armatures the commutation E. M. F. may be conveniently induced in the short-circuited part of the armature winding in the manner shown in Fig. 5. In this arrangement the core of the commutation transformer $k$ has the form of a laminated ring which is suitably secured on the rotating structure between the commutator and the armature.

The connectors $n$ from the armature winding to the commutator are given the required number of turns around the iron core of the transformer. The commutation generator $o$ may be placed outside the main bearing $p$ and be formed with a rotating armature and a stationary field structure. The supply leads $r$ for the primary winding of the commutation transformer are drawn through a hole $t$ bored in the shaft $s$. The stationary field coils $u$ are traversed by the main current, or a current proportional thereto, from the direct current generator. Thus the main current may pass from brush $b$ to coils $u$ through leads $c$ and thence to the outer circuit. This arrangement avoids the use of sliding contacts of any kind for the connections between the commutation generator and the commutation transformer. Obviously the conductors $g$ of Fig. 1, or $n$ of Fig. 5, may be connected with machines of other kinds than those described, for instance, with transformers supplied with alternating current from a suitable source, whereby the device may be used in sets to transform alternating current into direct current.

Having thus described our invention, what we claim is:—

1. The combination with an armature, of a commutator for said armature, leads connecting said armature and said commutator, an alternating current generator having a field magnet separate from the field magnet for said armature, and connections between said generator and said leads.

2. The combination with an armature, of a commutator for said armature, leads connecting said armature and said commutator, an alternating current generator having a field magnet separate from the field magnet for said armature, transformers whose secondary coils are connected into said leads, and connections between the primary coils of said transformers and said generator.

3. The combination with an armature of a commutator for said armature, leads connecting said armature and said commutator, an alternating current generator having a field magnet separate from the field magnet for said armature, means whereby the excitation of the field of said alternating current generator is affected by changes in the load on said armature, transformers whose secondary coils are connected into said leads, and connections between the primary coils of said transformers and said generator.

4. The combination with an armature, of a commutator for said armature, leads connecting said armature and said commutator, a source of alternating current separate from said armature, transformers each having one coil connected into one of said leads, and connections between the other coils of said transformers and said source of alternating current.

In testimony whereof we have affixed our signatures in presence of two witnesses.

BIRGER LJUNGSTRÖM.
AXEL DANIEL WIDSTROM.

Witnesses:
IMTA PRIM,
IRMA GRAAF.